(12) United States Patent
Zhong et al.

(10) Patent No.: US 11,783,457 B2
(45) Date of Patent: Oct. 10, 2023

(54) MULTISPECTRAL CAMERA DYNAMIC STEREO CALIBRATION ALGORITHM BASED ON SALIENCY FEATURES

(71) Applicant: DALIAN UNIVERSITY OF TECHNOLOGY, Liaoning (CN)

(72) Inventors: Wei Zhong, Liaoning (CN); Haojie Li, Liaoning (CN); Boqian Liu, Liaoning (CN); Zhihui Wang, Liaoning (CN); Risheng Liu, Liaoning (CN); Zhongxuan Luo, Liaoning (CN); Xin Fan, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 336 days.

(21) Appl. No.: 17/284,394

(22) PCT Filed: Mar. 5, 2020

(86) PCT No.: PCT/CN2020/077976
§ 371 (c)(1),
(2) Date: Apr. 9, 2021

(87) PCT Pub. No.: WO2021/098083
PCT Pub. Date: May 27, 2021

(65) Prior Publication Data
US 2022/0028043 A1   Jan. 27, 2022

(30) Foreign Application Priority Data
Nov. 22, 2019   (CN) .......................... 201911154076.9

(51) Int. Cl.
*G06T 5/00*      (2006.01)
*G06T 7/80*      (2017.01)
(Continued)

(52) U.S. Cl.
CPC .............. *G06T 5/006* (2013.01); *G06T 5/40* (2013.01); *G06T 5/50* (2013.01); *G06T 7/73* (2017.01);
(Continued)

(58) Field of Classification Search
CPC .................. H04N 13/246; H04N 13/25; G06T 2207/10048; G06T 7/85; G06T 7/80;
(Continued)

(56) References Cited

U.S. PATENT DOCUMENTS 10,554,950 B1 * 2/2020 Curlander ............ H04N 13/332
2018/0262748 A1 * 9/2018 Shibata ................ H04N 13/246
(Continued)

FOREIGN PATENT DOCUMENTS

CN       103761732 A       4/2014
CN       105205818 A       12/2015
(Continued)

OTHER PUBLICATIONS

Luo, Yan, et al. "Multi-camera saliency." IEEE Transactions on Pattern Analysis and Machine Intelligence 37.10 (2015): 2057-2070.*
(Continued)

*Primary Examiner* — Li Liu
(74) *Attorney, Agent, or Firm* — Muncy, Geissler, Olds & Lowe, P.C.

(57) ABSTRACT

A multispectral camera dynamic stereo calibration algorithm is based on saliency features. The joint self-calibration method comprises the following steps: step 1: conducting de-distortion and binocular correction on an original image according to internal parameters and original external parameters of an infrared camera and a visible light camera. Step 2: Detecting the saliency of the infrared image and the visible light image respectively based on a histogram con-
(Continued)

trast method. Step 3: Extracting feature points on the infrared image and the visible light image. Step 4: Matching the feature points extracted in the previous step. Step 5: judging a feature point coverage area. Step 6: correcting the calibration result. The present invention solves the change of a positional relationship between an infrared camera and a visible light camera due to factors such as temperature, humidity and vibration.

5 Claims, 3 Drawing Sheets

(51) Int. Cl.
　　*G06T 7/73*　　　(2017.01)
　　*G06T 5/40*　　　(2006.01)
　　*G06T 5/50*　　　(2006.01)
(52) U.S. Cl.
　　CPC ...... *G06T 7/80* (2017.01); *G06T 2207/10021* (2013.01); *G06T 2207/10024* (2013.01); *G06T 2207/10048* (2013.01); *G06T 2207/10052* (2013.01); *G06T 2207/20016* (2013.01); *G06T 2207/20164* (2013.01)

(58) Field of Classification Search
　　CPC . G06T 5/006; G06T 2207/20164; G06T 5/40; G06V 10/462; G06V 10/74
　　See application file for complete search history.

(56) References Cited

U.S. PATENT DOCUMENTS

| | | | |
|---|---|---|---|
| 2020/0177866 A1* | 6/2020 | Myokan | ............... G06T 7/80 |
| 2022/0132092 A1* | 4/2022 | Shibata | ............... G06V 10/25 |

FOREIGN PATENT DOCUMENTS

| | | |
|---|---|---|
| CN | 109146930 A | 1/2019 |
| CN | 109300161 A | 2/2019 |

OTHER PUBLICATIONS

Wang, Xiaogang. "Intelligent multi-camera video surveillance: A review." Pattern Recognition Letters 34 (2013): 3-19.*

Qi, Wang, Fu Li, and Liu Zhenzhong. "Review on camera calibration." 2010 Chinese control and decision conference. IEEE, 2010.*

* cited by examiner

MULTISPECTRAL CAMERA DYNAMIC STEREO CALIBRATION ALGORITHM BASED ON SALIENCY FEATURES

TECHNICAL FIELD

The present invention belongs to the field of image processing and computer vision, and relates to a multispectral camera dynamic stereo calibration algorithm based on saliency features.

BACKGROUND

Infrared is an electromagnetic wave with a wavelength between microwave and visible light, and its wavelength is longer than that of red light. Substances higher than absolute zero (−273.15° C.) can generate infrared rays. Infrared images are widely used in different fields such as military and national defense, resource exploration, weather forecasting, environmental monitoring, medical diagnosis and treatment and marine research due to the capability of observation through fog and rain. The infrared can be used to shoot scenes through mist and smoke, and can also be used for infrared photography at night. An infrared camera has the advantage of imaging in extreme scenes (low light, rain, snow and dense fog), and has the disadvantages of low resolution and blurred image details. In contrast, a visible light camera has the advantages of high resolution and clear image details, but cannot be used for imaging in the extreme scenes. Therefore, the combination of the infrared camera and the visible light camera has great practical significance.

Stereo vision is an important topic in the field of computer vision. The purpose is to reconstruct the 3D geometric information of the scenes. Binocular stereo vision is an important field of stereo vision. In the binocular stereo vision, left and right camera lenses are used to simulate two eyes. Depth images are calculated by calculating the difference between binocular images. The binocular stereo vision has the advantages of high efficiency, high accuracy, simple system structure and low cost. Because the binocular stereo vision needs to match the same point on the left and right image capture points, the focal length and image capture center of the two camera lenses of the camera, as well as a positional relationship between the left and right camera lenses shall be obtained. To obtain the above data, the camera needs to be calibrated. The acquisition of the positional relationship between the visible light camera and the infrared camera is called joint calibration.

In the calibration process, two camera lens parameters and relative position parameters of the camera are obtained, but these parameters are not stable. When temperature and humidity are changed, the internal parameters of the camera lenses are also changed. In addition, due to accidental camera collision, the positional relationship between the two camera lenses may be changed. Therefore, when the camera is used, internal and external parameters must be modified, which is self-calibration. When the internal parameters of the camera are known, the positional relationship between the infrared lens and the visible light lens is corrected by extracting the features of an infrared image and the features of a visible light image respectively, that is, the joint self-calibration of the infrared camera and the visible light camera.

Because the imaging of the infrared camera is different from that of the visible light camera, features with cross-modal robustness shall be found, and the saliency of the image is found as one of the features. The influence of cross-modal imaging differences can be overcome by detecting the saliency of the infrared image and the visible light image and extracting the matching feature points on the saliency images, thereby realizing a joint self-calibration function.

SUMMARY

The present invention aims to solve the change of a positional relationship between an infrared camera and a visible light camera due to factors such as temperature, humidity and vibration. Firstly, the saliency of an infrared image and a visible light image is detected, and matching feature points of an infrared saliency image and a visible light saliency image are extracted to correct an original calibration result.

A multispectral camera dynamic stereo calibration algorithm based on saliency features comprises the following steps:

Step 1: Original image correction: conducting de-distortion and binocular correction on an original image according to internal parameters and original external parameters of the infrared camera and the visible light camera.

Step 2: Detecting the saliency of the infrared image and the visible light image respectively based on a histogram contrast method.

Step 3: Extracting feature points on the infrared image, the visible light image and the saliency images thereof.

Step 4: Matching the feature points extracted in the previous step.

Step 5: Judging a feature point coverage area: dividing the image into m*n grids; if the feature points cover all the grids, executing a next step; otherwise continuing to shoot the image and repeating step 1 to step 4.

Step 6: Correcting the calibration result: using image coordinates of all the feature points to calculate the positional relationship between the two cameras after correction; and then superimposing with the original external parameters.

The step 1 specifically comprises the following steps:

1-1) Calculating the coordinates in a normal coordinate system corresponding to each original image point $P_i$.

A pixel coordinate system takes the upper left corner of the image as an origin, and x-axis and y-axis of the pixel coordinate system are parallel to x-axis and y-axis of an image coordinate system, respectively. The unit of the pixel coordinate system is the pixel. The pixel is a basic and indivisible unit of image display. The normal coordinate system takes the optical center of the camera as the origin of the image coordinate system and scales the distance from the optical center to an image plane to 1. A relationship between pixel coordinates and normal coordinates is as follows:

$$u = KX$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X \\ Y \\ 1 \end{bmatrix}$$

wherein $$u = \begin{bmatrix} u \\ v \\ 1 \end{bmatrix}$$

indicates the pixel coordinate of the image;

$$K = \begin{bmatrix} f_x & 0 & c_x \\ 0 & f_y & c_y \\ 0 & 0 & 1 \end{bmatrix}$$

indicates an internal parameter matrix of the camera; $f_x$ and $f_y$ respectively indicate the focal distances of the image in x direction and y direction (the unit is the pixel); $(c_x, c_y)$ indicates the principal point position of the camera; and $$X = \begin{bmatrix} X \\ Y \\ 1 \end{bmatrix}$$

is a coordinate in the normal coordinate system. The normal coordinate system corresponding to the pixel points can be calculated, i.e., $$X = K^{-1}u$$

The normal coordinate system of each original image point $P_i$ is:

$$X_i = K_i u_i$$

wherein $u_i$ is the pixel coordinate of $P_i$; $X_i$ is the normal coordinate of $P_i$; $K_i$ is the internal parameter matrix of the corresponding camera of $P_i$; if $P_i$ is a point on the infrared image, $K_i$ is the internal parameter matrix of the infrared camera; if $P_i$ is a point on the visible light image, $K_i$ is the internal parameter matrix of the visible light camera.

1-2) Removing image distortion: calculating the normal coordinate of an original image point after de-distortion.

Due to the limitation of a lens production process, a lens under actual conditions has some distortion phenomena, causing nonlinear distortion. The nonlinear distortion can be roughly classified into radial distortion and tangential distortion.

The radial distortion of the image is a position deviation of the image pixel points with the distortion center as the center point along the radial direction, thereby causing the distortion of the picture formed in the image. The radial distortion is roughly described as follows:

$$x_d = x(1 + k_1 r^2 + k_2 r^4 + k_3 r^6)$$

$$y_d = y(1 + k_1 r^2 + k_2 r^4 + k_3 r^6)$$

wherein $r^2 = x^2 + y^2$; $k_1$, $k_2$ and $k_3$ are radial distortion parameters.

The tangential distortion is generated by the defect in the camera manufacturing that makes the lens not parallel to the image plane, and can be quantitatively described as:

$$x_d = x + (2p_1 xy + p_2(r^2 + 2x^2))$$

$$y_d = y + (p_1(r^2 + 2y^2) + 2p_2 xy)$$

wherein $p_1$ and $p_2$ are tangential distortion coefficients.

In conclusion, the coordinate relationship before and after distortion is as follows:

$$x_d = x(1 + k_1 r^2 + k_2 r^4 + k_3 r^6) + (2p_1 xy + p_2(r^2 + 2x^2))$$

$$y_d = y(1 + k_1 r^2 + k_2 r^4 + k_3 r^6) + (p_1(r^2 + 2y^2) + 2p_2 xy)$$

wherein (x,y) is a normal coordinate in an ideal state, and $(x_d, y_d)$ is an actual normal coordinate with distortion.

Iterative computation is conducted for several times by taking $(x_d, y_d)$ as the initial value of (x, y) to obtain the actual (x, y).

1-3) Rotating the two images according to the original rotation relationship between the two cameras: an original rotation matrix R and a translation vector t between the two cameras are known:

$$X_r = R X_l + t$$

wherein $X_l$ indicates the normal coordinate of the infrared camera, and $X_r$ indicates the normal coordinate of the visible light camera. The infrared image is rotated to positive direction of R by half an angle, and the visible light image is rotated to opposite direction of R by half an angle.

For the normal coordinate $X_i$ of $P_i$ after de-distortion obtained in the previous step, if $P_i$ is a point on the infrared image, $R^{1/2} X_i \rightarrow X_i$; if $P_i$ is a point on the visible light image, $R^{-1/2} X_i \rightarrow X_i$.

1-4) Restoring the de-distorted and rotated image to the pixel coordinate system according to the formula u=KX; and calculating the de-distorted and corrected image coordinate according to the normal coordinate $P_i$ of the image point $X_i$ updated in the previous step.

$$K_i X_i \rightarrow u_i$$

It can be seen from the above that, if the coordinate $u_i$ of the point before de-distortion and correction is known, the coordinate of the de-distorted and corrected point calculated by steps 1-1)-1-4) is recorded as $F(u_i)$.

1-5) Calculating a pixel coordinate position $F^{-1}(v_i)$ of a corresponding original image $I_0$ of each image point $v_i$ of the de-distorted and corrected image I, and selecting a color value of the corresponding position from $I_0$ and filling in I.

$$I(v_i) = I_0(F^{-1}(v_i))$$

Because $F^{-1}(v_i)$ is a decimal coordinate, bilinear interpolation is needed to calculate the color value of the corresponding position of the decimal coordinate.

The step 2 specifically comprises the following steps:

2-1) Calculating saliency of each color. The saliency of the pixel is determined by the difference between the color of the pixel and the colors of other pixels. Therefore, pixels with the same color have the same saliency value. The saliency value of the pixel color is defined as:

$$s(I_k) = S(c_l) = \sum_{j=1}^{n} f_j D(c_l, c_j)$$

wherein n is the total number of the image colors; $c_j$ is the color value of the pixel point $I_k$; $D(c_l, c_j)$ indicates a distance between two colors $c_l$ and $c_j$ in a color space; and $f_j$ is occurrence probability of color $c_j$. In order to reduce the number of color types and reduce the calculation complexity, each color channel is quantized into several values.

2-2) Smoothing the color saliency for the purpose of reducing the noise caused by that similar colors are quantified as different values. The formula of the smoothed color saliency is as follows:

$$S'(c) = \frac{1}{(m-1)T} \sum_{i=1}^{m} (T - D(c, c_i)) S(c_i)$$

wherein m=n/4; $T=\Sigma_{i=1}^{m} D(c, c_i)$ is the sum of the distances between the color c and m nearest colors.

2-3) Determining the saliency according to the colors on the image pixel points to obtain a saliency image.

The step 3 specifically comprises the following steps:

Difference of Gaussian pyramid is obtained from the difference between adjacent scale spaces, and is often used for scale-invariant feature transform (SIFT). The scale space of an image is defined as: the convolution of a Gaussian convolution kernel and the image, which is a function of parameter σ in the Gaussian convolution kernel. Specifically, the scale space of a scene image I(x, y) is:

$$L(x,y,\sigma)=G(x,y,\sigma)*I(x,y)$$

wherein $$G(x, y, \sigma) = \frac{1}{2\pi\sigma} \times e^{-\frac{x^2+y^2}{2\sigma^2}}$$

is a Gaussian kernel function: σ is a scale factor; and the value of σ determines the smoothness of the image. A large σ value corresponds to a rough scale (low resolution), and a small σ value corresponds to a fine scale (high resolution). * indicates convolution operation. L(x,y,σ) is called as the scale space of the image I(x,y). The differences of scale spaces of different scales are calculated to obtain a layer of difference of Gaussian pyramid (as shown in FIG. 3). In addition, a normalized scale factor λ is multiplied so that the maximum value of the DoG image is 255.

$$D(x,y,\sigma)=\lambda(L(x,y,k\sigma)-L(x,y,\sigma))$$

Unlike SIFT, only a layer of differential scale features is calculated. Two reasons for this are as follows: firstly, the amount of calculation of multilayer differential scale features is too large, and timeliness cannot be realized; and secondly, the accuracy of SIFT features obtained by using the multilayer differential scale features is too low.

3-2) Taking local extreme points of a single-layer difference of Gaussian pyramid D obtained in the previous step as a feature point set {P}.

3-2-1) Expanding D and recording the result as $D_1$. Comparing each pixel point in $D_1$ with a point on an 8-neighborhood; and if the pixel point is a local maximum value, adding the pixel point to a candidate point set $P_1$.

3-2-2) Negating and expanding D, and recording the result as $D_2$. Comparing each pixel point in $D_2$ with a point on an 8-neighborhood; and if the pixel point is a local minimum value, adding the pixel point to a candidate point set $P_2$.

3-2-3) Intersecting $P_1$ and $P_2$ to obtain $P_3=P_1 \cap P_2$. Taking points having DoG gray value larger than 15 in $P_3$ as a feature point set {P}, wherein the feature point set of an infrared gray image is $P_{01}^l$; the feature point set of an infrared saliency image is $P_{02}^l$; the feature point set of a visible light gray image is $P_{01}^r$; and the feature point set of a visible light saliency image is $P_{02}^r$.

3-2-4) The feature point set of the infrared image is $P_0^l=P_{01}^l \cap P_{02}^l$; and the feature point set of the visible light image is $P_0^r=P_{01}^r \cap P_{02}^r$.

The step 4 specifically comprises the following steps:

4-1) Dividing the infrared image and the visible light image into m×n blocks respectively. Conducting steps 4-2) to 4-6) for each feature point $p_i^l$ of the infrared image.

4-2) Finding a block $b_{x_i,y_i}^l$ corresponding to $p_i^l$ in the infrared image (as shown in FIG. 4(a)), wherein the block at the same position in the visible light image as block $b_{x_i,y_i}^l$ is $b_{x_i,y_i}^r$, a block set $\{B_{x_i,y_i}^r\}$ has the same abscissa and ordinate as the block $b_{x_i,y_i}^r$ (as shown in FIG. 4(b)), and a feature point set is recorded as $\{P_i^r\}$. Assessing the degree of similarity between pixel points. If the degree of similarity is greater than a threshold $t_1$, regarding the pixel points as rough matching points, and recording the set as $\{p_i^r\}$; otherwise, discarding the points and selecting a next feature point to repeat step 4-2).

4-3) If the maximum similarity $s_{first}$ and the second maximum similarity $s_{second}$ in $p_i^l$ and $\{p_i^r\}$ satisfy:

$$F(s_{first}, s_{second}) \geq t_2$$

reserving the matching, wherein a point $p_i^r$ having the maximum similarity in $\{p_i^r\}$ is taken as a matching point, $t_2$ is a threshold and $F(s_{first}, s_{second})$ is used for describing a relationship between $s_{first}$ and $s_{second}$. If the maximum similarity and the second maximum similarity do not satisfy the formula, discarding the points and selecting a next feature point to repeat step 4-2).

After selection according to the rule, matching the corresponding feature point $p'_i^l$ of $p_i^r$ in the infrared image according to the steps 4-2) and 4-3); reserving the matching $\langle p_i^l, p_i^r \rangle$ if $p'_i^l=p_i^l$ is satisfied; if $p'_i^l=p_i^l$ is not satisfied, discarding the points and selecting a next feature point to repeat step 4-2).

4-4) Based on the infrared image feature point $p_i^l=(x_i^l,y_i^l)$, conducting parabolic fitting to optimize an integer pixel feature point $p_i^r=(x_i^r, y_i^r)$ corresponding to the visible light image, to obtain a sub-pixel feature point $p'_i^r=(x_i^r+j*_{rx}, y_i^r+j*_{ry})$ corresponding to the visible light image, wherein $j*_{rx}$ is a sub-pixel offset in x direction and $j*_{ry}$ is a sub-pixel offset in y direction.

4-5) Based on the integer pixel feature point $p_i^r=(x_i^r, y_i^r)$ corresponding to the visible light image, calculating the sub-pixel feature point $p'_i^l=(x_i^l+j*_{lx}, y_i^r+j*_{ly})$ corresponding to the infrared image according to the method of 4-4), wherein $j*_{lx}$ is a sub-pixel offset in x direction and $j*_{ly}$ is a sub-pixel offset in y direction.

4-6) Obtaining a final matching point pair of $\langle p'_i^l, p'_i^r \rangle$. Selecting a next infrared image feature point to repeat steps 4-2) to 4-6).

The step 6 specifically comprises the following steps:

6-1) Solving a basic matrix F and an essential matrix E according to the coordinates of the feature point pairs of the infrared image and the visible light image and the internal parameter matrices of the infrared camera and the visible light camera: a relationship between the pixel point pairs $u_l$ and $u_r$ corresponding to infrared light and visible light and the basic matrix F is:

$$u_r^T F u_l = 0$$

Further screening the point pairs by using random sample consensus (RANSAC); and substituting the coordinates of the corresponding points into the above formula to construct a homogeneous linear equation system to solve F.

A relationship between the basic matrix and the essential matrix is:

$$E=K_r^T F K_l$$

wherein $K_l$ and $K_r$ are respectively the internal parameter matrices of the infrared camera and the visible light camera.

6-2) Decomposing a relationship between rotation and translation of the infrared camera and the visible light camera after correction from the essential matrix: the rela tionship between the essential matrix E and rotation R and translation t is as follows:

$$E=[t]_x R$$

wherein $[t]_x$ indicates a cross product matrix of t.
Conducting singular value decomposition on E to obtain:

$$E = U\sum V^T = U\begin{bmatrix} 1 & 0 & 0 \\ 0 & 1 & 0 \\ 0 & 0 & 0 \end{bmatrix} V^T$$

Defining two matrices $$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \Sigma$$

Thus, writing E in the following two forms
(1) $E=UZU^T UWV^T$
setting $[t]_x=UZU^T$, $R=UWV^T$
(2) $E=-UZU^T UW^T V^T$
setting $[t]_x=-UZU^T$, $R=UW^T V^T$
Obtaining four pairs of R and t, and selecting a solution with three-dimensional meaning.

6-3) Superimposing the decomposed relationship between rotation and translation into the original external parameters.

Recording the rotation matrix before de-distortion as $R_0$ and the translation vector as $t_0=(t_x, t_y, t_z)^T$; recording the rotation matrix calculated in the previous step as R and the translation vector as $t=(t'_x, t'_y, t'_x)^T$ and new $R_{new}$ and $t_{new}$ are as follows:

$$R_{new} = R_0^{1/2} R R_0^{1/2}$$

$$t_{new} = R_0^{1/2} t_x \begin{bmatrix} 1 & \frac{t'_y}{t'_x} & \frac{t'_z}{t'_x} \end{bmatrix}$$

Multiplying $t_{new}$ by a coefficient so that the component of $t_{new}$ in x direction is $t_x^{new}=t_x$.

The present invention has the following beneficial effects:
The present invention solves the change of a positional relationship between an infrared camera and a visible light camera due to factors such as temperature, humidity and vibration. The present invention has the advantages of high speed, accurate results and simple operation. The saliency of the image, which is a feature with cross-modal robustness, is found. The influence of cross-modal imaging differences can be overcome by detecting the saliency of the infrared image and the visible light image and extracting and matching the feature points on the saliency images.

DETAILED DESCRIPTION

Figure 1:
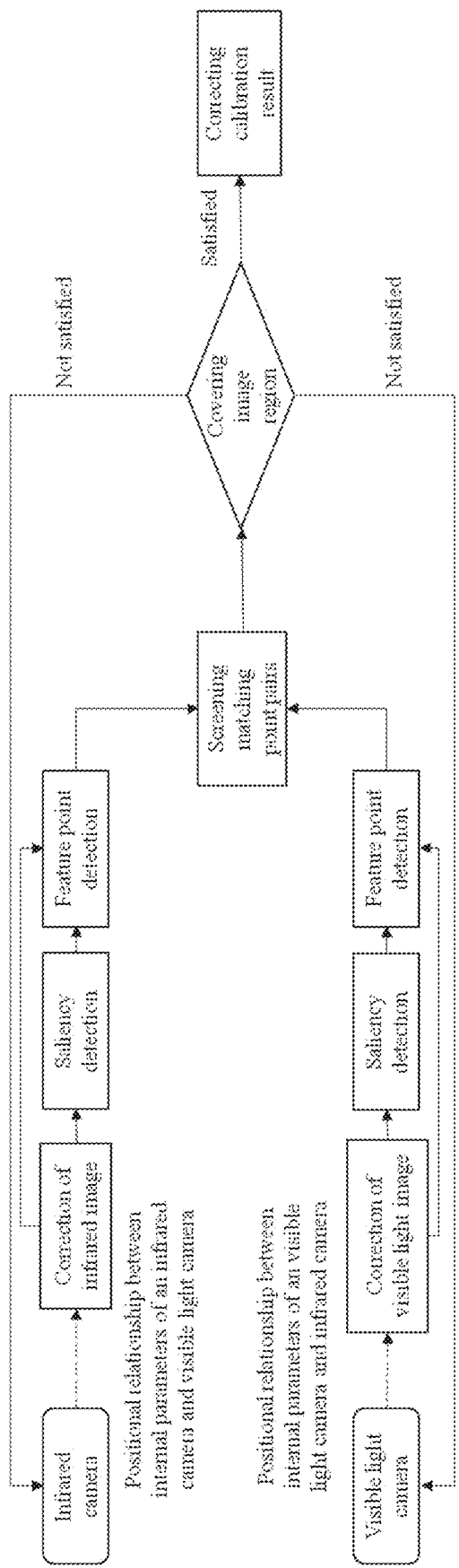
FIG. 1 is an overall flow chart.
Figure 2:
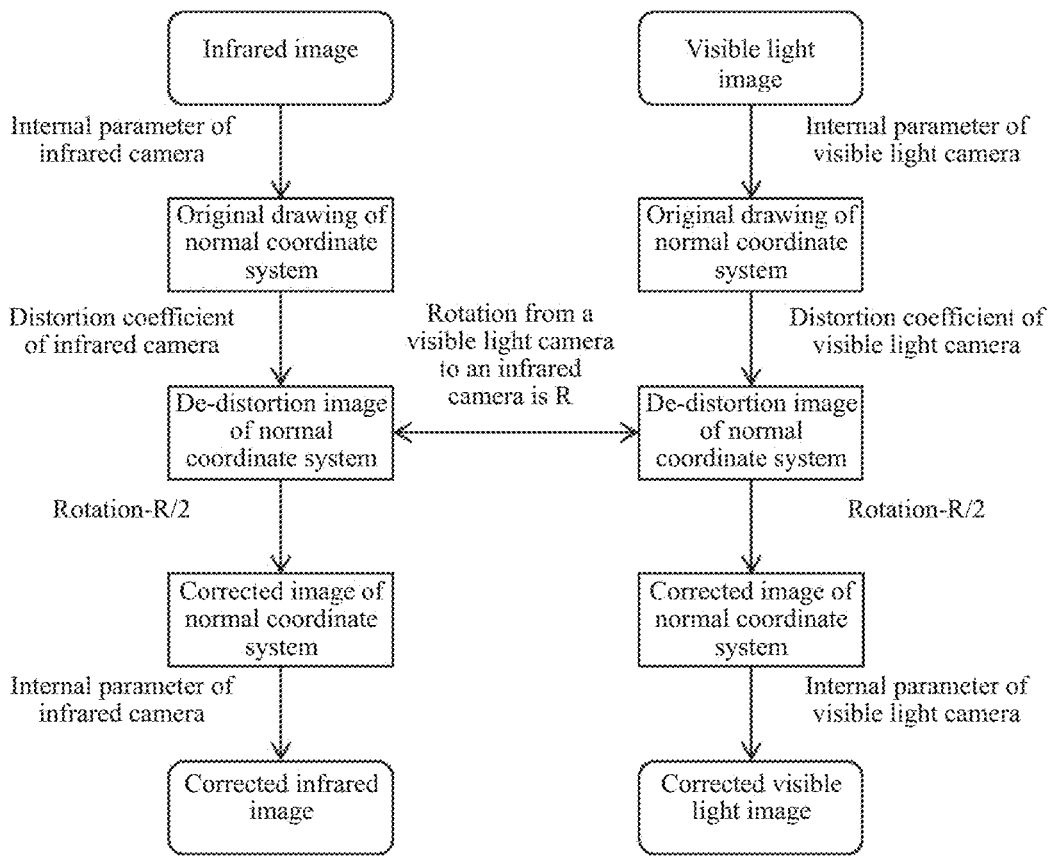
FIG. 2 is a correction flow chart.

Specific embodiments of the present invention are further described below in combination with accompanying drawings and the technical solution.

Step 1: Original image correction:
1-1) Calculating the coordinates in a normal coordinate system corresponding to each original image point $P_i$.

The normal coordinate system of each original image point $P_i$ is:

$$X_i = K_i u_i$$

wherein $u_i$ is the pixel coordinate of $P_i$; $X_i$ is the normal coordinate of $P_i$; $K_i$ is the internal parameter matrix of the corresponding camera of $P_i$; if $P_i$ is a point on the infrared image, $K_i$ is the internal parameter matrix of the infrared camera; if $P_i$ is a point on the visible light image, $K_i$ is the internal parameter matrix of the visible light camera.

1-2) Removing image distortion: calculating the normal coordinate of an original image point after de-distortion.

Iterative computation is conducted for several times by taking $(x_d, y_d)$ as the initial value of $(x, y)$ to obtain the actual $(x, y)$.

1-3) Rotating the two images according to the original rotation relationship between the two cameras:

For the normal coordinate $X_i$ of $P_i$ after de-distortion obtained in the previous step, if $P_i$ is a point on the infrared image, $R^{1/2} X_i \rightarrow X_i$; if $P_i$ is a point on the visible light image, $R^{-1/2} X_i \rightarrow X_i$ 1-4) Calculating the de-distorted and corrected image coordinate according to the normal coordinate $X_i$ of the updated image point $P_i$.

$$K_i X_i \rightarrow u_i$$

It can be seen from the above that, if the coordinate $u_i$ of the point before de-distortion and correction is known, the coordinate of the de-distorted and corrected point calculated by steps 1-1)-1-4) is recorded as $F(u_i)$.

1-5) Calculating a pixel coordinate position $F^{-1}(v_i)$ of a corresponding original image $I_0$ of each image point $v_i$ of the de-distorted and corrected image I, and selecting a color value of the corresponding position from $I_0$ and filling in I:

$$I(v_i) = I_0(F^{-1}(v_i))$$

Because $F^{-1}(v_i)$ is a decimal coordinate, bilinear interpolation is needed to calculate the color value of the corresponding position of the decimal coordinate.

2) Detecting the saliency of the infrared image and the visible light image respectively based on a histogram contrast method.

2-1) Calculating saliency of each color. The saliency of the pixel is determined by the difference between the color of the pixel and the colors of other pixels. Therefore, pixels with the same color have the same saliency value. The saliency value of the pixel color is defined as:

$$S(I_k) = S(c_i) = \sum_{j=1}^{n} f_j D(c_l, c_j)$$

wherein n is the total number of the image colors; $c_j$ is e color value of the pixel point $I_k$; $D(c_l, c_j)$ indicates a distance between two colors $c_l$ and $c_j$ in a color space; and $f_j$ is occurrence probability of color $c_j$. In order to reduce the number of color types and reduce the calculation complexity, each color channel is quantized into several values.

2-2) Smoothing the color saliency for the purpose of reducing the noise caused by that similar colors are quantified as different values. The formula of the smoothed color saliency is as follows:

$$S'(c) = \frac{1}{(m-1)T} \sum_{i=1}^{m} (T - D(c, c_i))S(c_i)$$

wherein $m=n/4$; $T=\Sigma_{i=1}^{m} D(c, c_i)$ is the sum of the distances between the color c and m nearest colors.

2-3) Determining the saliency according to the colors on the image pixel points to obtain a saliency image.

3) Extracting feature points on the infrared image, the visible light image and the saliency images thereof.

Figure 3:
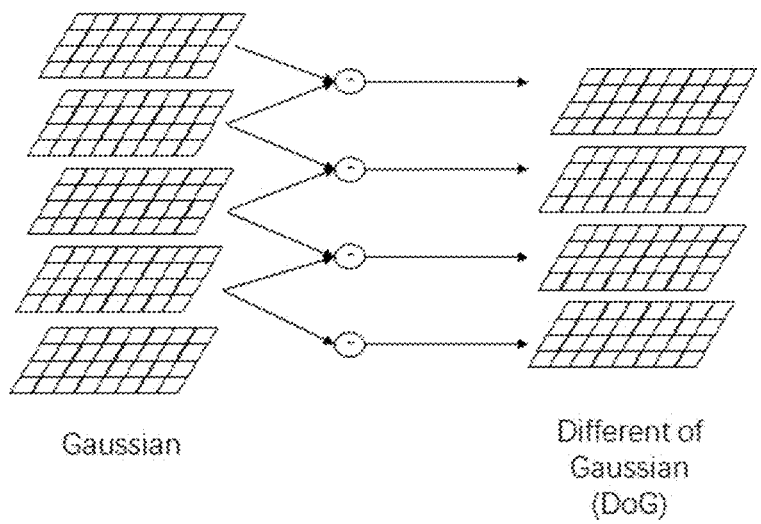
FIG. 3 shows difference of Gaussian pyramid (DoG).
Figure 4:
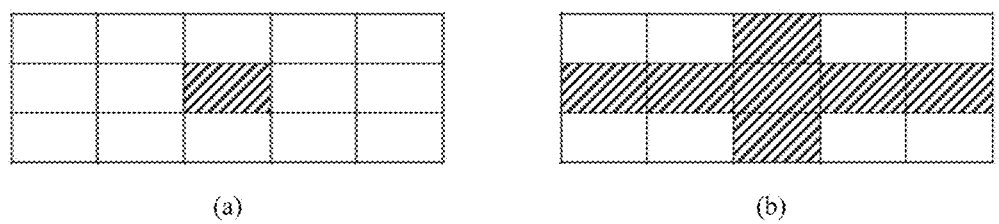
FIG. 4 is a schematic diagram of block matching.

3-1) Constructing a multi-scale difference of Gaussian pyramid (DoG). The DoG pyramid is obtained from the difference between adjacent scale spaces, and is often used for scale-invariant feature transform (SIFT). The scale space of an image is defined as: the convolution of a Gaussian convolution kernel and the image, which is a function of parameter σ in the Gaussian convolution kernel. Specifically, the scale space of a scene image I(x,y) is:

$$L(x,y,\sigma)=G(x,y,\sigma)*I(x,y)$$

wherein $$G(x, y, \sigma) = \frac{1}{2\pi\sigma^2} \times e^{-\frac{x^2+y^2}{2\sigma^2}}$$

is a Gaussian kernel function: σ is a scale factor; and the value of a determines the smoothness of the image. A large σ value corresponds to a rough scale (low resolution), and a small σ value corresponds to a fine scale (high resolution). * indicates convolution operation. $L(x,y,\sigma)$ is called as the scale space of the image $I(x,y)$. The differences of scale spaces of different scales are calculated to obtain a layer of difference of Gaussian pyramid (as shown in FIG. 3). In addition, a normalized scale factor λ is multiplied so that the maximum value of the DoG image is 255.

$$D(x,y,\sigma)=\lambda(L(x,y,k\sigma)-L(x,y,\sigma))$$

Unlike SIFT, only a layer of differential scale features is calculated. Two reasons for this are as follows; firstly, the amount of calculation of multilayer differential scale features is too large, and timeliness cannot be realized; and secondly, the accuracy of SIFT features obtained by using the multilayer differential scale features is too low.

3-2) Comparing each point in the DoG obtained in the previous step with the pixel points in the neighborhood to judge whether the point is a local extreme point.

3-2-1) Expanding D and recording the result as $D_1$. Comparing each pixel point in $D_1$ with a point on an 8-neighborhood; and if the pixel point is a local maximum value, adding the pixel point to a candidate point set $P_1$.

3-2-2) Negating and expanding D, and recording the result as $D_2$. Comparing each pixel point in $D_2$ with a point on an 8-neighborhood; and if the pixel point is a local minimum value, adding the pixel point to a candidate point set $P_2$.

3-2-3) Intersecting $P_1$ and $P_2$ to obtain $P_3=P_1 \cap P_2$. Taking points having DoG gray value larger than 15 in $P_3$ as a feature point set {P}, wherein the feature point set of an infrared gray image is $P_{01}^l$; the feature point set of an infrared saliency image is $P_{02}^l$; the feature point set of a visible light gray image is $P_{01}^r$; and the feature point set of a visible light saliency image is $P_{02}^r$.

3-2-4) The feature point set of the infrared image is $P_0^l=P_{01}^l \cap P_{02}^l$; and the feature point set of the visible light image is $P_0^r=P_{01}^r \cap P_{02}^r$.

4) Matching the feature points extracted in the previous step.

4-1) Dividing the infrared image and the visible light image into m×n blocks respectively; and conducting steps 4-2) to 4-6) for each corner point $p_i^l$ of the infrared image.

4-2) Finding a block $b_{x_i,y_i}^l$ corresponding to $p_i^l$ in the infrared image, wherein the block at the same position in the visible light image as block $b_{x_i,y_i}^l$ is $b_{x_i,y_i}^r$, a block set $\{B_{x_i,y_i}^r\}$ has the same abscissa and ordinate as the block $b_{x_i,y_i}^r$ and a corner point set is recorded as $\{P_i^r\}$.

Calculating the degree of similarity of any point in $p_i^l$ and $\{P_i^r\}$. If the degree of similarity is greater than a threshold $t_1$, regarding the point as rough matching point, and recording the set as $\{p_i^r\}$; otherwise, discarding the point and selecting a next corner point to repeat step 4-2).

4-3) If the maximum similarity $s_{first}$ and the second maximum similarity $s_{second}$ in $p_i^l$ and $\{p_i^r\}$ satisfy:

$$F(s_{first}, s_{second}) \geq t_2$$

Reserving the matching, wherein a point $p_i^r$ having the maximum similarity in $\{p_i^r\}$ is taken as a matching point, $t_2$ is a threshold and $F(s_{first}, s_{second})$ is used for describing a relationship between $s_{first}$ and $s_{second}$; if the maximum similarity and the second maximum similarity do not satisfy the formula, discarding the point and selecting a next corner point to repeat step 4-2).

After selection according to the rule, matching the corresponding corner point $p'_i^l$ of $p_i^r$ in the infrared image according to the steps 4-2) and 4-3); reserving the matching $\langle p_i^l, p_i^r \rangle$ if $p'_i^l=p_i^l$ is satisfied; if $p'_i^l=p_i^l$ is not satisfied, discarding the points and selecting a next feature point to repeat step 4-2).

4-4) Based on the infrared image corner point $p_i^l=(x_i^l, y_i^l)$, conducting parabolic fitting to optimize an integer pixel corner point $p_i^r=(x_i^r, y_i^r)$ corresponding to the visible light image, to obtain a sub-pixel corner point $p'_i^r=(x_i^r+j^*_{rx}, y_i^r+j^*_{ry})$ corresponding to the visible light image, wherein $j^*_{rx}$ is a sub-pixel offset in x direction and $j^*_{ry}$ is a sub-pixel offset in y direction.

4-5) Based on the integer pixel corner point $p_i^r=(x_i^r,y_i^r)$ corresponding to the visible light image, calculating the sub-pixel corner point $p'_i^l=(x_i^l+j^*_{lx}, y_i^l+j^*_{ly})$ corresponding to the infrared image according to the method of 4-4), wherein $j^*_{lx}$ is a sub-pixel offset in x direction and $j^*_{ly}$ is a sub-pixel offset in y direction.

4-6) Obtaining a final matching point pair of $\langle p'_i^l, p'_i^r \rangle$; and selecting a next infrared image corner point to repeat steps 4-2) to 4-6).

5) Judging a feature point coverage area: dividing the image into m*n grids; if the feature points cover all the grids, executing a next step; otherwise continuing to shoot the image and repeating step 1) to step 4).

6) Correcting the calibration result: using image coordinates of all the feature points to calculate the positional relationship between the two cameras after correction; and then superimposing with the original external parameters.

6-1) Further screening the point pairs by using random sample consensus (RANSAC); and substituting the coordinates of the corresponding points into the above formula to construct a homogeneous linear equation system to solve F.

A relationship between the basic matrix and the essential matrix is:

$$E = K_r^T F K_l$$

wherein $K_l$ and $K_r$ are respectively the internal parameter matrices of the left camera and the right camera.

6-2) Decomposing a relationship between rotation and translation of the left camera and the right camera after correction from the essential matrix: the relationship between the essential matrix E and rotation R and translation t is as follows:

$$E = [t]_x R$$

wherein $[t]_x$ indicates a cross product matrix of t;
Conducting singular value decomposition on E to obtain:

$$E = U\Sigma V^T = U \begin{bmatrix} 1 & 0 & 0 \\ 0 & 1 & 0 \\ 0 & 0 & 0 \end{bmatrix} V^T$$

Defining two matrices $$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \Sigma$$

Thus, writing E in the following two forms
(1) $E = UZU^T UWV^T$
setting $[t]_x = UZU^T$, $R = UWV^T$
(2) $E = -UZU^T UW^T V^T$
setting $[t]_x = -UZU^T$, $R = UW^T V^T$ Obtaining four pairs of R and t, and selecting a solution with three-dimensional meaning.

6-3) Superimposing the decomposed relationship between rotation and translation into the original external parameters.
Calculation results.
The rotation matrix R and the translation vector t before de-distortion are:

$$R = \begin{bmatrix} 0.999990 & -0.004293 & 0.000874 \\ 0.004295 & 0.999987 & -0.002599 \\ -0.000863 & 0.002603 & 0.999996 \end{bmatrix}$$

$$t = [-342.4272 \quad -2.0244 \quad -0.7514]^T$$

The calculated rotation matrix is R', and the translation vector is t'

$$R' = \begin{bmatrix} 0.999999 & -0.001413 & 0.000990 \\ 0.001413 & 0.999999 & -0.000238 \\ -0.000990 & 0.000239 & 0.999999 \end{bmatrix}$$

$$t' = [-1.000 \quad -0.0050 \quad -0.0075]^T$$

New $R_{new}$ and $t_{new}$ are:

$$R_{new} = \begin{bmatrix} 0.999982 & -0.005704 & 0.001866 \\ 0.005709 & 0.999980 & -0.002834 \\ -0.001850 & 0.002845 & 0.999994 \end{bmatrix}$$

$$t_{new} = [-342.4272 \quad 0.9829 \quad -2.4117]^T.$$

The invention claimed is:
1. A multispectral camera dynamic stereo calibration algorithm based on saliency features, stored on a non-transitory computer-readable medium, and when executed by a processor, causes the processor to perform the following steps:
  step 1: original image correction: conducting de-distortion and binocular correction on an original image according to internal parameters and original external parameters of an infrared camera and a visible light camera;
  step 2: detecting a saliency of an infrared image and a visible light image respectively based on a histogram contrast method;
  2-1) calculating saliency of each color; and defining a saliency value of the pixel color as:

$$S(I_k) = S(c_l) = \sum_{j=1}^{n} f_j D(c_l, c_j)$$

wherein n is the total number of image colors; $c_j$ is the color value of the pixel point $I_k$; $D(c_l, c_j)$ indicates a distance between two colors $c_l$ and $c_j$ in a color space; and $f_j$ is occurrence probability of color $c_j$; in order to reduce the number of color types and reduce a calculation complexity, each color channel is quantized into several values;
  2-2) smoothing a color saliency, wherein the formula of the smoothed color saliency is as follows:

$$S'(c) = \frac{1}{(m-1)T} \sum_{i=1}^{m} (T - D(c, c_i)) S(c_i)$$

wherein m=n/4; $T = \Sigma_{i=1}^{m} D(c, c_i)$ is the sum of the distances between the color c and m nearest colors;
  2-3) determining the saliency according to colors on image pixel points to obtain a saliency image;
  step 3: extracting feature points on the infrared image, the visible light image and saliency images thereof;
  step 4: matching the feature points extracted in the previous step;
  4-1) dividing the infrared image and the visible light image into m×n blocks respectively; and conducting steps 4-2) to 4-6) for each feature point $P_i^l$ of the infrared image;
  4-2) finding a block $b_{x_i,y_i}^l$ corresponding to $P_i^l$ in the infrared image, wherein the block at the same position in the visible light image as block $b_{x_i,y_i}^l$ is $b_{x_i,y_i}^r$, a block set $\{B_{x_i,y_i}^r\}$ has the same abscissa and ordinate as the block $b_{x_i,y_i}^r$, and a feature point set is recorded as $\{P_i^r\}$; assessing a degree of similarity between pixel points; if the degree of similarity is greater than a threshold $t_1$, regarding the pixel points as rough matching points, and recording the set as $\{p_i^r\}$; otherwise, discarding the points and selecting a next feature point to repeat step 4-2);
  4-3) if the maximum similarity $s_{first}$ and the second maximum similarity $s_{second}$ in $p_i^l$ and $\{p_i^r\}$ satisfy:

$$F(s_{first}, s_{second}) \geq t_2$$

reserving the matching, wherein a point $p_i^r$ having the maximum similarity in $\{p_i^r\}$ is taken as a matching point, $t_2$ is a threshold and $F(s_{first}, s_{second})$ is used for describing a relationship between $s_{first}$ and $s_{second}$; if the maximum similarity and the second maximum similarity do not satisfy the formula, discarding the points and selecting a next feature point to repeat step 4-2);

after selection according to above rule, matching the corresponding feature point $p'^I_i$ of $p^i_r$ in the infrared image according to the steps 4-2) and 4-3); reserving the matching $(p^I_i, p^r_i)$ if $p'^I_i=p^I_i$ satisfied; if $p'^I_i=p^I_i$ is not satisfied, discarding the points and selecting a next feature point to repeat step 4-2);

4-4) based on the infrared image feature point $P^I_i=(x^I_i, y^I_i)$, conducting parabolic fitting to optimize an integer pixel feature point $p^r_i=(x^r_i, y^r_i)$ corresponding to the visible light image, to obtain a sub-pixel feature point $p'^r_i=(x^r_i+j^*_{rx}, y^r_i+j^*_{ry})$ corresponding to the visible light image, wherein $j^*_{rx}$ is a sub-pixel offset in x direction and $j^*_{ry}$ is a sub-pixel offset in y direction;

4-5) based on the integer pixel feature point $p^r_i=(x^r_i, y^r_i)$ corresponding to the visible light image, calculating the sub-pixel feature point $p'^I_i=(x^I_i+j^*_{Ix}, y^I_i+j^*_{Iy})$ corresponding to the infrared image according to the method of 4-4), wherein $j^*_{Ix}$ is a sub-pixel offset in x direction and $j^*_{Iy}$ is a sub-pixel offset in y direction;

4-6) obtaining a final matching point pair of $(p'^I_i, p'^r_i)$; and selecting a next infrared image feature point to repeat steps 4-2) to 4-6);

step 5: judging a feature point coverage area: dividing the infrared image and the visible light image into m*n grids; if the feature points cover all the grids, executing a next step; otherwise continuing to shoot the image and repeating step 1 to step 4;

step 6: correcting a calibration result: using image coordinates of all the feature points of the infrared image and the visible light image to calculate the positional relationship between the infrared camera and the visible light camera after correction; and then superimposing with the original external parameters.

2. The multispectral camera dynamic stereo calibration algorithm based on saliency features according to claim 1, wherein the step 1 comprises the following steps:

1-1) calculating the image coordinates in a normal coordinate system corresponding to each original image point $P_i$;

the normal coordinate system of each original image point $P_i$ is:

$$X_i=K_i u_i$$

wherein $u_i$ is a pixel coordinate of $P_i$; $X_i$ is a normal coordinate of $P_i$; $K_i$ is an internal parameter matrix of a corresponding infrared camera of $P_i$; if $P_i$ is a point on the infrared image, $K_i$ is the internal parameter matrix of the infrared camera; if $P_i$ is a point on the visible light image, $K_i$ is the internal parameter matrix of the visible light camera;

1-2) removing image distortion: calculating the normal coordinate of an original image point after de-distortion;

iterative computation is conducted for several times by taking $(x_d, y_d)$ as an initial value of $(x, y)$ to obtain the actual $(x, y)$;

1-3) rotating the infrared image and the visible light image according to the original rotation relationship between the infrared image camera and the visible light image camera: an original rotation matrix R and a translation vector t between the infrared image camera and the visible light image camera are known:

$$X_r=RX_I+t$$

wherein $X_I$ indicates the normal coordinate of the infrared camera, and $X_r$ indicates the normal coordinate of the visible light camera; the infrared image is rotated to positive direction of R by half an angle, and the visible light image is rotated to opposite direction of R by half an angle;

for the normal coordinate $X_i$ of $P_i$ after de-distortion obtained in the previous step, if $P_i$ is a point on the infrared image, $R^{1/2}X_i \rightarrow X_i$; if $P_i$ is a point on the visible light image, $R^{-1/2}X_i \rightarrow X_i$ 1-4) restoring the de-distorted and rotated image to the pixel coordinate system according to the formula u=KX; and calculating the de-distorted and corrected image coordinate according to the normal coordinate $X_i$ of the image point $P_i$ updated in the previous step;

$$K_i X_i \rightarrow u_i$$

if the coordinate $u_i$ of the point before de-distortion and correction is known, the coordinate of the de-distorted and corrected point calculated by steps 1-1)-1-4) is recorded as $F(u_i)$;

1-5) calculating a pixel coordinate position $F^{-1}(v_i)$ of a corresponding original image $I_0$ of each image point $v_i$ of a de-distorted and corrected image I, and selecting a color value of a corresponding position from $I_0$ and filling in I:

$$I(v_i)=I_0(F^{-1}(v_i))$$

because $F^{-1}(v_i)$ is a decimal coordinate, bilinear interpolation is needed to calculate the color value of the corresponding position of the decimal coordinate.

3. The multispectral camera dynamic stereo calibration algorithm based on saliency features according to claim 1, wherein the step 6 comprises the following steps:

6-1) solving a basic matrix F and an essential matrix E according to the coordinates of the feature point pairs of the infrared image and the visible light image and the internal parameter matrices of the infrared camera and the visible light camera: a relationship between the pixel point pairs $u_i$ and $u_r$ corresponding to infrared light and visible light and the basic matrix F is:

$$u_r^T F u_I = 0$$

further screening the point pairs by using random sample consensus (RANSAC); and substituting the coordinates of the corresponding points into the above formula to construct a homogeneous linear equation system to solve the basic matrix F;

a relationship between the basic matrix and the essential matrix is:

$$E=K_r^T F K_I$$

wherein $K_I$ and $K_r$ are respectively the internal parameter matrices of the infrared camera and the visible light camera;

6-2) decomposing a relationship between rotation and translation of the infrared camera and the visible light camera after correction from the essential matrix: the relationship between the essential matrix E and rotation R and translation t is as follows:

$$E=[t]_x R$$

wherein $[t]_x$ indicates a cross product matrix of t;

conducting singular value decomposition on E to obtain:

$$E = U\Sigma V^T = U \begin{bmatrix} 1 & 0 & 0 \\ 0 & 1 & 0 \\ 0 & 0 & 0 \end{bmatrix} V^T$$

defining two matrices $$Z = \begin{bmatrix} 0 & 1 & 0 \\ -1 & 0 & 0 \\ 0 & 0 & 0 \end{bmatrix} \text{ and } W = \begin{bmatrix} 0 & -1 & 0 \\ 1 & 0 & 0 \\ 0 & 0 & 1 \end{bmatrix}, ZW = \Sigma$$

thus, writing E in the following two forms
(1) $E = UZU^T UWV^T$
setting $[t]_x = UZU^T$, $R = UWV^T$
(2) $E = -UZU^T UW^T V^T$
setting $[t]_x = -UZU^T$, $R = UW^T V^T$
obtaining four pairs of R and t, and selecting a solution with three-dimensional meaning;
6-3) recording the rotation matrix before de-distortion as $R_0$ and the translation vector as $t_0 = (t_x, t_y, t_z)^T$; recording the rotation matrix calculated in the previous step as R and the translation vector as $t = (t'_x, t'_y, t'_z)^T$; and new $R_{new}$ and $t_{new}$ are as follows:

$$R_{new} = R_0^{1/2} R R_0^{1/2}$$

$$t_{new} = R_0^{1/2} t_x \begin{bmatrix} 1 & \dfrac{t'_y}{t'_x} & \dfrac{t'_z}{t'_x} \end{bmatrix}$$

multiplying $t_{new}$ by a coefficient so that a component of $t_{new}$ in x direction is $t_x^{new} = t_x$.

4. The multispectral camera dynamic stereo calibration algorithm based on saliency features according to claim 3, wherein the step 3 comprises the following steps:
taking local extreme points of an obtained single-layer difference of Gaussian pyramid D as a feature point set {P};
3-2-1) expanding the Gaussian pyramid D and recording a result as $D_1$; comparing each pixel point in the result $D_1$ with a point on an 8-neighborhood; and if the pixel point is a local maximum value, adding the pixel point to a candidate point set $P_1$;
3-2-2) negating and expanding the Gaussian pyramid D, and recording the result as $D_2$;
comparing each pixel point in the result $D_2$ with a point on an 8-neighborhood; and if the pixel point is a local minimum value, adding the pixel point to a candidate point set $P_2$;
3-2-3) intersecting the candidate set points $P_1$ and $P_2$ to obtain a set point $P_3 = P_1 \cap P_2$; taking points having DoG gray value larger than 15 in the set point $P_3$ as a feature point set {P}, wherein the feature point set of an infrared gray image is $P_{01}^l$; the feature point set of an infrared saliency image is $P_{02}^l$; the feature point set of a visible light gray image is $P_{01}^r$; and the feature point set of a visible light saliency image is $P_{02}^r$;
3-2-4) the feature point set of the infrared image is $P_0^l = P_{01}^l \cup P_{02}^l$; and the feature point set of the visible light image is $P_0^r = P_{01}^r \cup P_{02}^r$.

5. The multispectral camera dynamic stereo calibration algorithm based on saliency features according to claim 1, wherein the step 3 comprises the following steps:
taking local extreme points of an obtained single-layer difference of Gaussian pyramid D as a feature point set {P};
3-2-1) expanding the Gaussian pyramid D and recording a result as $D_1$; comparing each pixel point in the result $D_1$ with a point on an 8-neighborhood; and if the pixel point is a local maximum value, adding the pixel point to a candidate point set $P_1$;
3-2-2) negating and expanding the Gaussian pyramid D, and recording a result as $D_2$; comparing each pixel point in the result $D_2$ with a point on an 8-neighborhood; and if the pixel point is a local minimum value, adding the pixel point to a candidate point set $P_2$;
3-2-3) intersecting the candidate point sets $P_1$ and $P_2$ to obtain a point set $P_3 = P_1 \cap P_2$; taking points having DoG gray value larger than 15 in the point set $P_3$ as a feature point set {P}, wherein the feature point set of an infrared gray image is $P_{01}^l$; the feature point set of an infrared saliency image is $P_{02}^l$; the feature point set of a visible light gray image is $P_{01}^r$; and the feature point set of a visible light saliency image is $P_{02}^r$;
3-2-4) the feature point set of the infrared image is $P_0^l = P_{01}^l \cup P_{02}^l$; and the feature point set of the visible light image is $P_0^r = P_{01}^r \cup P_{02}^r$.

\* \* \* \* \*